United States Patent
O'Neill

(10) Patent No.: US 7,415,158 B1
(45) Date of Patent: *Aug. 19, 2008

(54) METHOD FOR DETERMINING WHETHER TO USE A LOSSY OR LOSSLESS CODEC TO COMPRESS A DIGITAL IMAGE USING A TABLE OF NON-ALLOWED PIXEL VALUES

(75) Inventor: Thomas O'Neill, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 862 days.

This patent is subject to a terminal disclaimer.

(21) Appl. No.: 10/883,278

(22) Filed: Jun. 30, 2004

(51) Int. Cl.
*G06K 9/36* (2006.01)

(52) U.S. Cl. .................. 382/232; 382/166; 382/244

(58) Field of Classification Search .............. 382/162, 382/166, 232, 233, 235, 240, 244–253; 358/523, 358/539; 345/589
See application file for complete search history.

(56) References Cited

U.S. PATENT DOCUMENTS

| 5,553,160 | A  | * | 9/1996  | Dawson ..................... 382/166 |
| 6,044,172 | A  | * | 3/2000  | Allen ......................... 382/166 |
| 6,650,773 | B1 | * | 11/2003 | Maurer et al. ............... 382/166 |
| 2003/0071823 | A1 | * | 4/2003 | Fukasawa .................. 345/589 |

* cited by examiner

*Primary Examiner*—Duy M Dang
(74) *Attorney, Agent, or Firm*—Gunnison, McKay & Hodgson, L.L.P.; Philip J. McKay

(57) ABSTRACT

A mechanism for determining whether an image is of lossy-origin or lossless origin is used to maximize the compression ratio of any future compressions and avoid wasting the precious resources associated with lossless compression/decompression on any image that has previously been subjected to lossy compression/decompression.

3 Claims, 3 Drawing Sheets

METHOD FOR DETERMINING WHETHER TO USE A LOSSY OR LOSSLESS CODEC TO COMPRESS A DIGITAL IMAGE USING A TABLE OF NON-ALLOWED PIXEL VALUES

FIELD OF THE INVENTION

The present invention relates generally to compression of video images and, in particular, to detecting color conversions after an image has been subjected to a compression/decompression process to determine if the compression/decompression was a lossy or lossless process.

BACKGROUND OF THE INVENTION

The rise of multimedia computing appliances and digital video transmission has led to an increased need to store and manipulate many-colored and complex digital images. Examples of many-colored and complex digital images include: digital photographic images of the natural world, whether taken with a digital camera or digitized from an analog camera print; computer-generated images of the natural world; and/or computer-generated images which include anti-aliased text or graphics.

Due to the complexity of many-colored digital images, it is often necessary to compress the images in order to save storage space and/or minimize bandwidth when storing or transmitting the digital images. The compression/decompression process typically uses standardized algorithms well known to those of skill in the art. The algorithms for compressing and decompressing the images are known generically as COmpressor/DECompressors or "codecs".

Codecs are typically grouped into two main types; lossless and lossy. Lossless codecs, like LZ coding and GIF, preserve the image information in its exact form. While providing virtually perfect image replication capabilities, lossless codecs tend to provide less compression opportunities and require more resources, such as storage space and transmission bandwidth, to employ. On the other hand, lossy codecs, such as JPEG and vector quantization, store only an approximate representation of the image. Lossy codecs are typically formulated based on the capabilities and limitations of the human visual system to detect subtle differences in color. In other words, granularity and detail beyond that capable of being detected by the human eye are disregarded and do not survive the compression process. Since, using lossy codecs, digital information is selectively discarded, lossy codecs typically achieve much better compression than lossless codecs while still maintaining acceptable quality.

Once digital information has undergone a lossy compression/decompression, there is little or no point in ever using lossless compression on the information again. This is because the irrelevant data has already been disregarded so that any lossless compression/decompression would, in effect, result in using extra resources to try to save information that has already been lost. In contrast, further lossy compressions/decompressions of digital information that has undergone a lossy compression/decompression already has very little, if any, affect on the resulting image quality.

In light of the discussion above, it is clear that once information has undergone a lossy compression/decompression using a lossy codec, all further compressions/decompressions should probably also be conducted using a lossy codec in order to achieve a high compression ratio and avoid wasting the precious resources associated with lossless compression/decompression. However, in the prior art, there was no mechanism for determining whether a given digital image, or block of digital information, had previously undergone a lossy or lossless compression/decompression and, therefore, there was no mechanism for determining whether the resources required for a lossless compression/decompression should be committed or not. Consequently, in the prior art, it was either deemed safest to commit the considerable resources associated with lossless compression/decompression on all images or to sacrifice image quality across the board. Of course, this resulted in inefficient use of resources and often resulted in unnecessarily degraded images.

As an example, consider a program in the prior art that needed to compress a digital image with an unknown history. One example would be an image-editing program that had imported a ppm file containing raw RGB values. Suppose now that the program wanted to export the image. It may be that the ppm file was generated by decoding a JPEG file, a lossy codec, but the program had no prior-art way of knowing if this was the case. In this instance, lossless compression would be desirable for images of "lossless-origin" that had never been subject to a lossy compression step in order to preserve quality. On the other hand, lossy compression would be preferred for images of "lossy-origin" that had already been subject to a lossy compression step in order to improve the compression ratio and save resources. However, as noted above, in the prior art, there was no mechanism for determining whether a given digital image, or block of digital information, had previously undergone a lossy or lossless compression/decompression and, therefore, there was no mechanism for determining whether the resources required for a lossless compression/decompression should be committed or not. Consequently, the choice was presented of either risking a poor compression ratio and inefficient use of resources or potentially losing image quality.

Another example of an situation where there is a need to compress an image with no knowledge of its source is in remote computing applications. There are several different remote-computing applications where screen information is generated on one computer, the "host" computer, and transmitted for display on another computer, the "display" computer. In some systems, the display computer is a multipurpose computer, an X-terminal, a thin-client, or a Personal Digital Assistant (PDA). X-terminals, thin-clients, and Personal Digital Assistants (PDAs) are limited-purpose computers, some having no hard drive and some designed only for remote computing applications. In these instances, the host and display computers can communicate via any sort of network connection, including wireless. Consequently, in remote computing applications, it is frequently desirable to reduce the network bandwidth used because doing so provides shorter transmission times between the host and display computers, leading to a faster-updating remote display device and reduced load on the network, leading to improved network performance. In addition, reducing the network bandwidth used by remote computing applications provides the capability to use more devices on a single network. For typical computing, including web browsing, the host/display network bandwidth will in many cases be dominated by the transmission of digital images with a large number of colors. Thus, some remote display applications use lossless and/or lossy digital image codecs to compress such images for lower-bandwidth transmission. Once again, it would be extremely helpful to know if a lossless or lossy codec were previously used on a given image. Web browsing is a common source of many-colored images. Many web pages contain digital photographs that have been compressed using lossless codecs like GIF or PNG or lossy codecs such as JPEG. In the prior art, the remote display application's host computer typically knew the RGB values of the decoded image, but did not know how the image was originally encoded. Again, it would be efficient to use a lossless codec to encode lossless-origin images and a lossy codec to encode lossy-origin images. This information would be particularly valuable at bandwidths where the lossy codec is noticeably faster to paint, due to its higher compression ratio, but where the lossy codec paint speed is still acceptable. Unfortunately, as discussed above, in the prior art there was no mechanism for determining whether a given digital image, or block of digital information, had previously undergone a lossy or lossless compression/decompression and, therefore, there was no mechanism for determining whether the resources required for a lossless were necessitated.

What is needed is a method of determining whether an image is of lossy-origin of lossless origin prior to a subsequent compression/decompression.

SUMMARY OF THE INVENTION

The present invention provides a mechanism for determining whether an image is of lossy-origin or lossless origin so that a subsequent compression/decompression can result in the highest ratio of compression without compromising quality, thereby making the most efficient use of resources.

One embodiment of the present invention makes use of RGB values and/or patterns that a given lossy codec cannot reproduce exactly to determine that a lossy codec has previously been used on a given digital image or information block. Consequently, using the method of the invention, the previous use of a lossy codec is detected and all further compressions/decompressions of the given image or information block can also be lossy compressions/decompressions in order to maximize the compression ratio and avoid wasting the precious resources associated with lossless compression/decompression.

According to one embodiment of the present invention, for a large enough image, the missing RGB values or patterns that a given lossy codec cannot reproduce exactly become a "signature" of the lossy codec that was used to compress the image. Indeed, in principle, the exact lossy encoding that was previously used on the digital image or information block can be deduced after the fact.

The present invention makes use of the fact that most lossy codecs use color conversion as the first step in encoding. The color conversion used in a lossy encoding is typically a lossy, or non-invertible, process. Like many transformations, it does not provide a one-to-one mapping from RGB to YCbCr values and back. For example, the Y value of CCIR601 YCbCr color is restricted to the range [16,235] even though the R, G, and B values cover the larger range [0,255]. Thus, there are many cases where multiple RGB values map into a single YCbCr value. When this YCbCr value is color converted back to RGB, only one of these multiple RGB values ever occurs. Consequently, the other RGB values can never occur in an image that was compressed with that color conversion.

Another common color conversion is that of the JPEG File Interchange Format (JFIF), which is generally used for JPEG images. As those of skill in the art are aware, JPEG is the most common lossy image source used in the art. Consequently, in one embodiment of the invention, the only color conversion tested for is JFIF.

It is usually not practical for a program to simply store the list of unrepresentable RGB values for each color conversion, since it is so large (of order 255^3). Consequently, in one embodiment of the invention, an alternative solution is to see if the color conversion is invertible for each unique RGB value in the image. In this embodiment of the invention, the RGB value is converted to YCbCr, then converted back to RGB. If a different RGB value results, then the original RGB value cannot have resulted from the color conversion. In one embodiment of the invention, this test is not used if any of R, G, B, Y, Cb, or Cr equals their minimum or maximum allowed value. In such a case, clamping can interfere with the linear nature of the color conversion transformation and there may be a nearby YCbCr value that does reproduce the original RGB value. If the programmer insists on including such extremal RGB/YCbCr values in the color conversion determination, then the program should test nearby YCbCr values explicitly to see if they produce the RGB value being tested.

According to the present invention, if an image is found to have a large number of unique RGB values and all of these colors can result from a given YCbCr to RGB color conversion, then there is a very high probability that the image was at some point encoded with a lossy codec using that color conversion. Thus, the image would be a good candidate for re-compression using a lossy codec. Furthermore, if the JFIF color conversion was used, then the image was probably at some point compressed using the JPEG codec. Thus, it may be desirable to re-compress the image using a JPEG or other DCT-based codec. In this manner, any artifacts that are introduced will be of the same nature as were introduced in the original JPEG encoding.

As mentioned above, according to the present invention, the automatic detection of color conversion can be used as the first step of a determination of all of the details of the lossy encoding used in the generation of the image. By combining this with other automatic detection technologies, the image can be re-encoded using the same lossy codec in a way that introduces minimal, or no, additional loss.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of, this specification, illustrate embodiments of the invention and, together with the description, serve to explain the advantages and principles of the invention. In the drawings.

DETAILED DESCRIPTION

Figure 1:
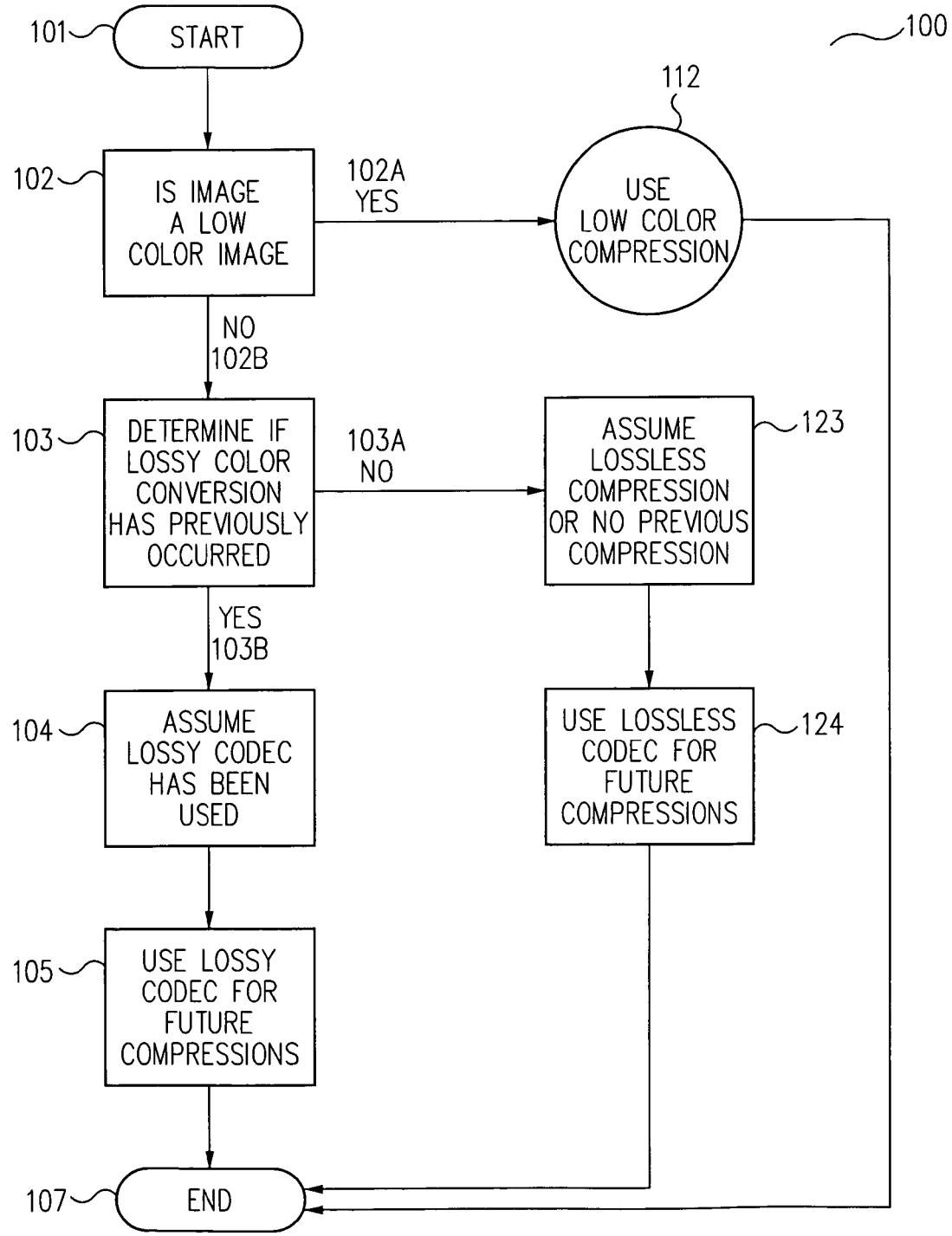
FIG. 1 shows a flow chart of one embodiment of a method for determining whether to employ a lossy or lossless codec to compress a digital image in accordance with the principles of the invention.

The invention will now be described in reference to the accompanying drawings. The same or similar reference numbers may be used throughout the drawings and the following description to refer to the same or like parts.

The present invention provides a mechanism (100 in FIG. 1, 200 in FIG. 2 and 300 in FIG. 3) for determining whether an image is of lossy-origin or lossless origin so that a subsequent compression/decompression can result in the highest ratio of compression without compromising quality and thereby make the most efficient use of resources.

The present invention makes use of RGB values and/or patterns that a given lossy codec cannot reproduce exactly to determine that a lossy codec has previously been used on a given digital image or information block. Consequently, using the method of the invention, the previous use of a lossy codec is detected and all further compressions/decompressions of the given image or information block can also be lossy compressions/decompressions in order to maximize the compression ratio and avoid wasting the precious resources associated with lossless compression/decompression.

According to the present invention, for a large enough image, the missing RGB values or patterns that a given lossy codec cannot reproduce exactly become a "signature" of the lossy codec that was used to compress the image. Indeed, in principle, the exact lossy encoding that was previously used on the digital image or information block can be deduced after the fact.

One embodiment of the present invention makes use of the fact that most lossy codecs use color conversion as the first step in encoding. Color conversion is, in general, a lossy, or non-invertible, process. Like many transformations, it does not provide a one-to-one mapping from RGB to YCbCr values and back. For example, the Y value of CCIR601 YCbCr color is restricted to the range [16,235] even though the R, G, and B values cover the larger range [0,255]. Thus, there are many cases where multiple RGB values map into a single YCbCr value. When this YCbCr value is color converted back to RGB, only one of these multiple RGB values ever occurs. Consequently, the other RGB values can never occur in an image that was compressed with that color conversion.

Another common color conversion is that of the JPEG File Interchange Format (JFIF), which is generally used for JPEG images. Consequently, in one embodiment of the invention, the only color conversion tested for is JFIF.

The present invention makes use of the fact that each color conversion has a large and distinct set of unrepresentable RGB values. If one of these RGB values occurs in an image, that color conversion can be excluded as a possibility. For a large enough image, the color conversion that was used can be determined with very little ambiguity. According to the method of the invention, if no color conversion is consistent with the missing RGB values, the image is then determined to be lossless-origin.

As an example, along the line R=B=128, there are 223 G values (1-10, 12-24, 26-30, 32-3 . . . ) that cannot be produced by CCIR 601 and 195 G values (1, 3, 5-10, 12-13, 15, 17-18, 20-22, 24-25 . . . ) that cannot be produced by JFIF. Thus, an image containing R=B=128 and G=2 cannot originate from CCIR 601 but can originate from JFIF. An image containing R=B=128 and G=25 cannot originate from JFIF, but can originate from CCIR 601. Such RGB values can be used to distinguish between the two color conversions, or to eliminate the possibility that one of these color conversions was used.

In some instances, it is not practical for a program to simply store the list of unrepresentable RGB values for each color conversion, since it is so large (of order 255^3). Consequently, in one embodiment of the invention, an alternative solution is to see if the color conversion is invertible for each (unique) RGB value in the image. That is, convert the RGB value to YCbCr, then convert back to RGB. If a different RGB value results, then the original RGB value cannot result from the color conversion. In one embodiment of the invention, this test is not used if any of R, G, B, Y, Cb, or Cr equals their minimum or maximum allowed value. In such a case, clamping can interfere with the linear nature of the color conversion transformation and there may be a nearby YCbCr value that does reproduce the original RGB value. If the programmer insists on including such extreme RGB/YCbCr values in the color conversion determination, then the program should test nearby YCbCr values explicitly to see if they produce the RGB value being tested.

According to the present invention, if an image is found to have a large number of unique RGB values and all of these colors can result from a given YCbCr to RGB color conversion, then there is a very high probability that the image was at some point encoded with a lossy codec using that color conversion. Thus, the image would be a good candidate for re-compression using a lossy codec. Furthermore, if the JFIF color conversion was used, then the image was probably at some point compressed using the JPEG codec. Thus, it may be desirable to re-compress the image using a JPEG or other DCT-based codec. In this manner, any artifacts that are introduced will be of the same nature as were introduced in the original JPEG encoding.

As mentioned above, according to the present invention, the automatic detection of color conversion can be used as the first step of a determination of all of the details of the lossy encoding used in the generation of the image. By combining this with other automatic detection technologies, the image can be re-encoded using the same lossy codec in a way that introduces no additional loss.

FIG. 1 shows a flow chart of one embodiment of a method 100 for determining whether to employ a lossy or lossless codec to compress a digital image in accordance with one embodiment of the invention. As seen in FIG. 1, at 101 the method of the invention starts and proceeds to 102 where a determination is made as to whether the image to be compressed is a "low color image", i.e., an image having a relatively small number of colors present. If at 102A it is determined that the image is a low color image, then there are several low color codecs know to those of skill in the art that can be employed to both increase the compression ratio and preserve the quality of the image. Consequently, at 112, the image is compressed using one of these low color codecs and the process moves directly to end 107.

If, on the other hand, at 102B, it is determined that the image is not a low color image, then the process moves on to 103. At 103, a determination is made as to whether the image has been subjected to a lossy color conversion. If it is determined that a lossy color conversion has not taken place at 103A, then the process moves onto 123 where it is assumed that either the image has been compressed/decompressed previously using a lossless codec, i.e., the image is of lossless origin, or the image has not previously been compressed. Either way, according to the present invention, the image is considered of lossless origin and, at 124, a lossless codec is used to compress the image in order to conserve image quality. The method then moves on to end 107.

If, on the other hand, at 103B it is determined that the image has been subjected to a lossy color conversion, then, according to the invention, it is assumed that the image has been previously compressed and decompressed using a lossy codec. Indeed, even if a lossy codec has not been used, by definition, the use of a lossy color conversion has at least resulted in a lossy compression for this reason alone. Consequently, at 104, it is assumed the image has undergone a lossy compression/decompression and therefore, at 105, according to the present invention, all future compressions/decompressions are performed using a lossy codec to increase the compression ratio. The method then ends at end 107.

As discussed above, once an image or digital information has undergone a lossy compression/decompression using a lossy codec, all further compressions/decompressions should probably also be conducted using a lossy codec in order to avoid wasting the precious resources associated with lossless compression/decompression. Method 100 of the present invention provides a mechanism for determining whether a given digital image, or block of digital information, has previously undergone a lossy or lossless compression/decompression and, therefore, method 100 of the present invention provides a mechanism for determining whether the resources required for a lossless compression/decompression should be committed. Consequently, in contrast to the prior art, method 100 of the present invention allows for efficient use of resources, the highest compression ratios, and the highest quality images.

Figure 2:
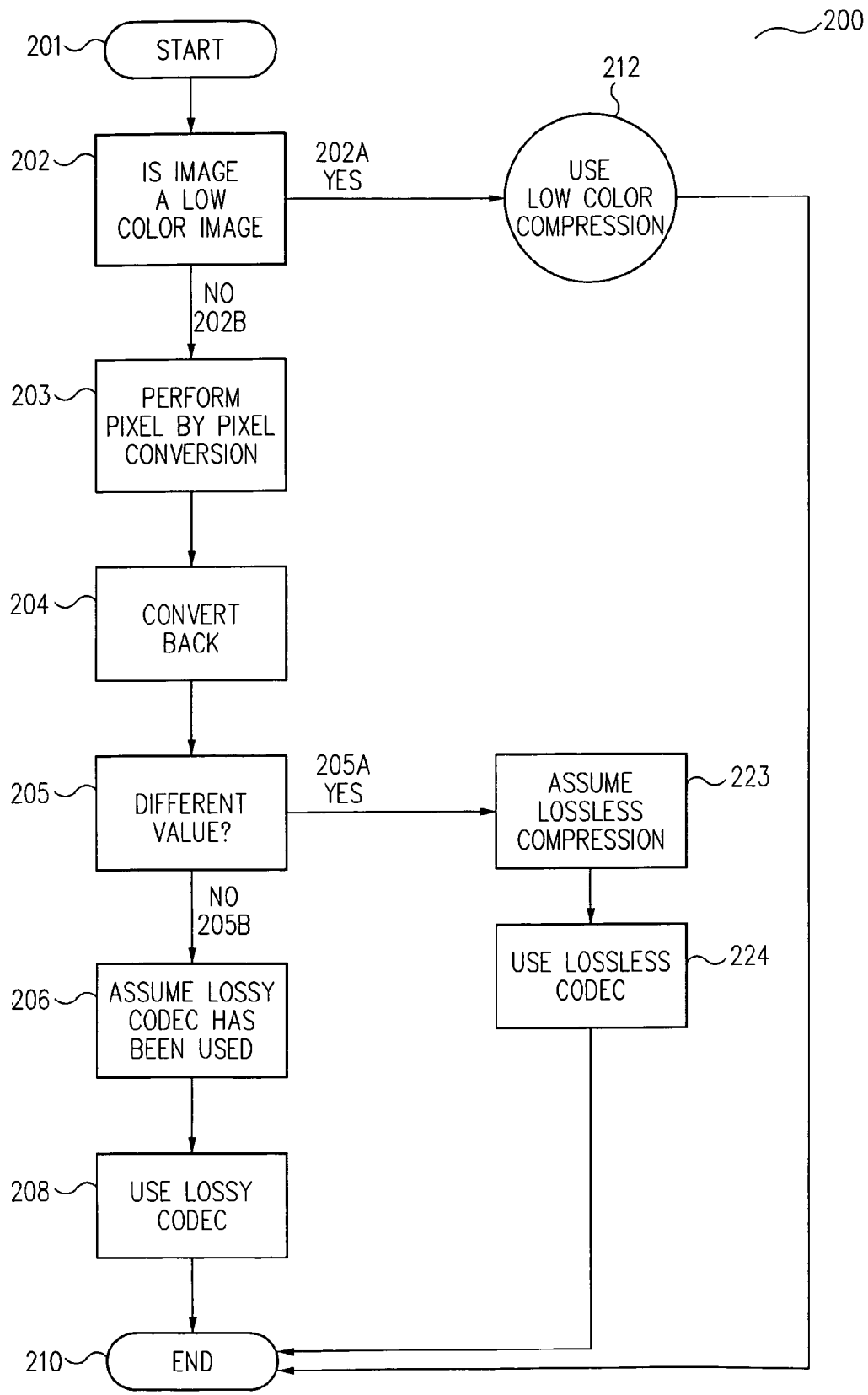
FIG. 2 shows a flow chart of one embodiment of a method for determining whether to employ a lossy or lossless codec to compress a digital image in which a pixel-by-pixel conversion is used in accordance with the principles of the invention.

FIG. 2 shows a flow chart of one embodiment of a method 200 for determining whether to employ a lossy or lossless codec to compress a digital image in which a pixel-by-pixel conversion is used in accordance with one embodiment of the invention. In the discussion below, and in FIG. 2, only the exemplary case where a single color conversion, such as JFIF, is examined for simplicity sake and to avoid detracting from the invention. However, those of ordinary skill in the art will readily recognize that the invention can readily be expanded to the testing for multiple color conversions. Consequently, the single color conversion case discussed was chosen merely to simply the situation and thereby promote reader understanding of the underlying inventive concepts.

As seen in FIG. 2, at 201 the method of the invention starts and proceeds to 202 where a determination is made as to whether the image to be compressed is a "low color image", i.e., an image having a relatively small number of colors present. If at 202A it is determined that the image is a low color image, then there are several low color codecs known to those of skill in the art that can be employed to both increase the compression ratio and preserve the quality of the image. Consequently, at 212, the image is compressed using one of these low color codecs and the process moves on to end 210.

If, on the other hand, at 202B, it is determined that the image is not a low color image then the process moves on to 203. At 203, a determination is made as to whether the image has been subjected to a lossy color conversion.

In the embodiment of the invention shown in FIG. 2, the determination as to whether the image has been subjected to a lossy color conversion is made by pixel-by-pixel conversion at 203 and then a re-conversion processes at 204 to determine if the color conversion is invertible for each (unique) RGB value in the image. That is, convert the RGB value of each pixel to YCbCr, then convert back to RGB. If a different RGB value results, then the original RGB value cannot result from the color conversion. In one embodiment of the invention, this test is not used if any of R, G, B, Y, Cb, or Cr equals their minimum or maximum allowed value. In such a case, clamping can interfere with the linear nature of the color conversion transformation and there may be a nearby YCbCr value that does reproduce the original RGB value. If the programmer insists on including such extreme RGB/YCbCr values in the color conversion determination, then the program should test nearby YCbCr values explicitly to see if they produce the RGB value being tested.

At 205, the process determines if a lossy codec has been used. In one embodiment of the invention, test 205 is performed for every pixel. If the RGB value for any pixel is not reproduced, then the method moves on to 223. If, on the other hand, the RGB value for every pixel is reproduced, then the method moves on to 206. Consequently, if at 205A it is determined that a lossy color conversion has not taken place at 203A, i.e., a different RGB value results for some pixel, then the process moves onto 223 where it is assumed that either the image has been compressed/decompressed previously using a lossless codec, i.e., the image is of lossless origin, or the image has not previously been compressed. Either way, according to the present invention, the image is considered of lossless origin and, at 224, a lossless codec is used to compress the image in order to conserve image quality. The method then moves on to end 210.

If, on the other hand, at 205B it is determined that the image has been subjected to a lossy color conversion, i.e., the same RGB value results for every pixel, then, according to the invention, it is assumed that the image has been previously compressed and decompressed using a lossy codec. Indeed, even if a lossy codec has not been used, by definition, the use of a lossy color conversion has at least resulted in a lossy compression for this reason alone. Consequently, at 206, it is assumed the image has undergone a lossy compression/decompression and therefore, at 208, according to the present invention, all future compressions/decompressions are performed using a lossy codec to increase the compression ratio. The method then ends at end 210.

Figure 3:
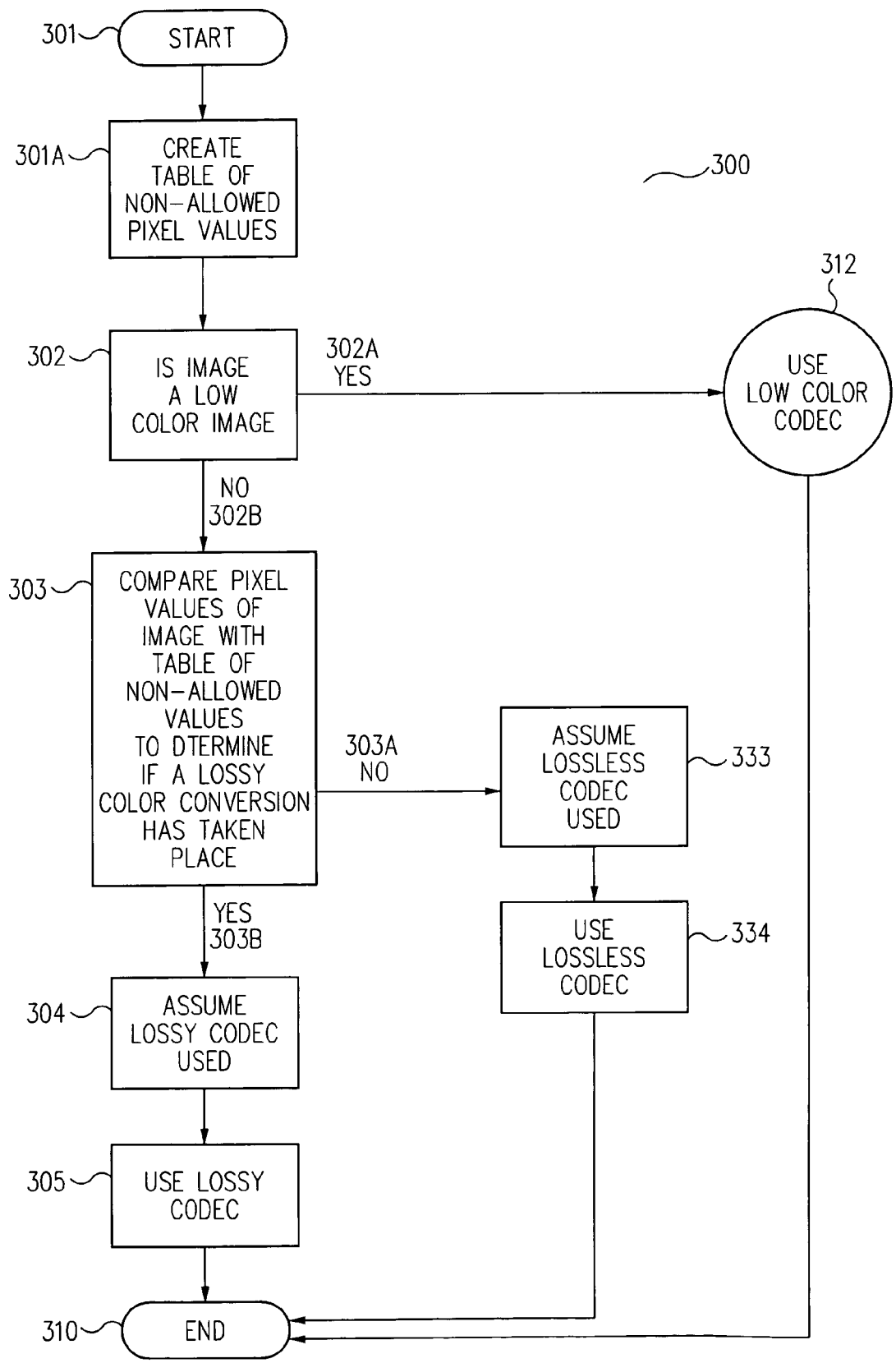
FIG. 3 shows a flow chart of one embodiment of a method for determining whether to employ a lossy or lossless codec to compress a digital image in which a table of forbidden pixel values is used in accordance with the principles of the invention.

FIG. 3 shows a flow chart of one embodiment of a method 300 for determining whether to employ a lossy or lossless codec to compress a digital image in which a table of forbidden pixel values is used in accordance with one embodiment of the invention. As seen in FIG. 3, at 301 the method of the invention starts and at 301A a table of forbidden or "non-allowed" pixel values is created. At 302, a determination is made as to whether the image to be compressed is a "low color image", i.e., an image having a relatively small number of colors present. If at 302A it is determined that the image is a low color image, then there are several low color codecs know to those of skill in the art that can be employed to both increase the compression ration of the compression and preserve the quality of the image. Consequently, at 312, the image is compressed using one of these low color codecs and the process moves on to end 310.

If, on the other hand, at 302B, it is determined that the image is not a low color image then the process moves on to 303. At 303, a determination is made as to whether the image has been subjected to a lossy color conversion.

In the embodiment of the invention shown in FIG. 3, the determination as to whether the image has been subjected to a lossy color conversion is made by making use of the fact that color conversion is, in general, a lossy, or non-invertible, process. Like many transformations, it does not provide a one-to-one mapping from RGB to YCbCr values and back. For example, the Y value of CCIR601 YCbCr color is restricted to the range [16,235] even though the R, G, and B values cover the larger range [0,255]. Thus, there are many cases where multiple RGB values map into a single YCbCr value. When this YCbCr value is color converted back to RGB, only one of these multiple RGB values ever occurs. Consequently, the other RGB values can never occur in an image that was compressed with that color conversion. Therefore, according to this embodiment of the invention a catalog or table of non-allowed pixel values is kept. If these values occur then the image was not compressed using the color conversion under test.

If it is determined that a lossy color conversion has not taken place at 303A, then the process moves onto 333 where it is assumed that either the image has been compressed/decompressed previously using a lossless codec, i.e., the image is of lossless origin, or the image has not previously been compressed. Either way, according to the present invention, the image is considered of lossless origin and, at 334, a lossless codec is used to compress the image in order to conserve image quality. The method then moves on to end at 310.

If, on the other hand, at 303B it is determined that the image has been subjected to a lossy color conversion, then, according to the invention, it is assumed that the image has been previously compressed and decompressed using a lossy codec. Indeed, even if a lossy codec has not been used, by definition, the use of a lossy color conversion has at least resulted in a lossy compression for this reason alone. Consequently, at 304, it is assumed the image has undergone a lossy compression/decompression and therefore, at 305, according to the present invention, all future compressions/decompressions are performed using a lossy codec to increase the compression ratio. The method then ends at end 310.

As discussed above, the present invention provides a mechanism for determining whether a given digital image, or block of digital information, has previously undergone a lossy or lossless compression/decompression and, therefore, the present invention provides a mechanism for determining whether the resources required for a lossless compression/decompression should be committed or not. Consequently, in contrast to the prior art, the present invention allows for efficient use of resources, highest compression ratios and the highest quality images.

The foregoing description of an implementation of the invention has been presented for purposes of illustration and description only, and therefore is not exhaustive and does not limit the invention to the precise form disclosed. Modifications and variations are possible in light of the above teachings or may be acquired from practicing the invention.

Consequently, the scope of the invention is defined by the claims and their equivalents.

What is claimed is:

1. A method for determining whether to employ a lossy or lossless codec on a digital image comprising:
   determining if said image has been subjected to a lossy color conversion;
   if said image has been subjected to a lossy color conversion assuming said image is of lossy origin;
   if said image has not been subjected to a lossy color conversion assuming said image is of lossless origin;
   if said image is of assumed lossy origin, using a lossy codec to compress and decompress said image;
   wherein said determining if said image has been subjected to a lossy color conversion comprises:
   creating a table of non-allowed pixel values; checking each unique pixel value of said image against said table of non-allowed pixel values.

2. A method for determining whether to employ a lossy or lossless codec on a digital image comprising:
   determining if said image has been subjected to a lossy color conversion, said determining if said image has been subjected to a lossy color conversion comprising:
   creating a table of non-allowed pixel values; checking each unique pixel value of said image against said table of non-allowed pixel values;
   if said image is determined to have been subjected to a lossy color conversion assuming said image is of lossy origin;
   if said image is determined not to have been subjected to a lossy color conversion assuming said image is of lossless origin;
   if said image is of assumed lossy origin, using a lossy codec to compress and decompress said image.

3. A method for determining whether to employ a lossy or lossless codec on a digital image comprising:
   determining if said image has been subjected to a lossy color conversion;
   if said image has been subjected to a lossy color conversion assuming said image is of lossy origin;
   if said image has not been subjected to a lossy color conversion assuming said image is of lossless origin;
   if said image is of assumed lossy origin, using a lossy codec to compress or decompress said image;
   wherein said determining if said image has been subjected to a lossy color conversion comprises:
   creating a table of non-allowed pixel values; and checking unique pixel values of said image against said table of non-allowed pixel values.

* * * * *